United States Patent
Bolognia et al.

[11] Patent Number: 5,896,986
[45] Date of Patent: Apr. 27, 1999

[54] ROSETTE HAVING RADIALLY DEFLECTABLE FINGER ENDS FOR HOLDING DISC SHAPED ELEMENTS

[75] Inventors: David Louis Bolognia, Lanesboro; George Francis Rufo, Jr., Dalton; Daniel Edward Cornwell, Pittsfield, all of Mass.

[73] Assignee: Lakewood Industries, Inc., Pittsfield, Mass.

[21] Appl. No.: 08/938,355

[22] Filed: Sep. 29, 1997

Related U.S. Application Data

[63] Continuation-in-part of application No. 08/808,020, Mar. 3, 1997, abandoned.

[51] Int. Cl.⁶ .................................................. B65D 85/57
[52] U.S. Cl. ........................ 206/310; 206/308.1; 206/493
[58] Field of Search ........................ 206/308.1, 309–313, 206/493

[56] References Cited

U.S. PATENT DOCUMENTS

| | | |
|---|---|---|
| 5,249,677 | 10/1993 | Lim . |
| 5,263,580 | 11/1993 | Ciba et al. . |
| 5,284,243 | 2/1994 | Gelardi et al. . |
| 5,372,253 | 12/1994 | O'Brien et al. . |
| 5,377,825 | 1/1995 | Sykes et al. ............................. 206/313 |
| 5,417,324 | 5/1995 | Joyce et al. . |
| 5,494,156 | 2/1996 | Nies . |
| 5,529,182 | 6/1996 | Anderson et al. . |
| 5,586,651 | 12/1996 | Krummenacher . |
| 5,685,425 | 11/1997 | Choi . |
| 5,685,427 | 11/1997 | Kuitems et al. . |
| 5,746,315 | 5/1998 | Luckow ............................... 206/308.1 |

FOREIGN PATENT DOCUMENTS

| | | |
|---|---|---|
| 2 187 442 | 9/1987 | United Kingdom . |
| WO 88/06559 | 9/1988 | WIPO . |

*Primary Examiner*—Paul T. Sewell
*Assistant Examiner*—Luan K. Bui
*Attorney, Agent, or Firm*—Sixbey, Friedman, Leedom & Ferguson, PC; Stuart J. Friedman

[57] ABSTRACT

An improved rosette for securing at least one disc shaped element having a central aperture includes a raised circular hub having a substantially cylindrical side wall, the hub projecting upward from a planar base; at least one resilient, arcuate, circumferentially extending finger integrally formed with the hub and extending along the perimeter of the hub, each finger being formed integrally with the hub at one end and free at the other end; at least one aperture defined in the base, the number of apertures corresponding to the number of fingers, the fingers being arranged so that the free ends thereof overhang the apertures for permitting the free ends to substantially unobstructedly deflect arcuately inwardly when the disc is inserted on the hub; and a radially extending protrusion on the free end of each finger projecting outwardly beyond the outside diameter of the hub. The perimetric edge of the disc central aperture engages the protrusions when the disc is placed on the hub, causing the fingers to move arcuately inwardly from the perimeter of the hub to allow the disc central aperture to slide downwardly over the hub, the fingers resiliently engaging the perimetric edge of the disc central aperture to hold the disc in place on the hub.

30 Claims, 6 Drawing Sheets

ROSETTE HAVING RADIALLY DEFLECTABLE FINGER ENDS FOR HOLDING DISC SHAPED ELEMENTS

CROSS REFERENCE TO RELATED APPLICATIONS

This application is a continuation-in-part of application Ser. No. 08/808,020, filed Mar. 3, 1997, abandoned.

BACKGROUND OF THE INVENTION

1. Field of the Invention

The present invention relates generally to enclosures for receiving and storing digitally coded discs and, more particularly, to an improved engagement means for holding such discs within such enclosures.

2. Description of the Prior Art

Various types of planar discs are in use at the present time to record and store information which is to be retrieved by various means, such as by optical or magnetic means. Typical of such discs are compact discs (CDs) in which information is digitally recorded by use of a laser beam and then read optically by a laser beam. Such discs are used to record audio information, such as musical renditions, video information such as visual images and digital information for use as read only and other memories for use in various applications, such as computer applications. In most instances, at the present time, such discs are sold with information already recorded thereon. In other applications, such discs are sold in blank form and are used by the customer to record information thereon. In the latter case, for example, optical discs are sold for use as computer storage media and are used in hard disc storage systems. In either case, optical imperfections in or on the surfaces of such discs interfere with both the recording and retrieval of information stored on the discs. Care must, therefore, be taken in the storage, moving and handling of such discs to avoid causing any such imperfections.

Compact discs containing laser recorded information are typically packaged in enclosures designed to hold one or more CDs for protecting the discs during storage and shipment. Enclosures commonly used at the present time comprise a three piece assembly consisting of a base or bottom element, an insert or tray in the base/bottom element for positioning and supporting the disc in the base/bottom element, e.g., by a center projection (commonly referred to as a "rosette") which engages the periphery of the aperture in the center of the disc, and a lid or cover which is hinged to the base/bottom element and is closed thereon after the disc is mounted therein on the tray. Other enclosures utilize only two pieces, omit the tray, and position and support the disc via the center projection directly on the base/bottom element. The enclosure is, typically, at least partially transparent and graphics relating to the disc and containing trademark and sales promotional information are usually inserted in such a manner as to be visible through the enclosure.

Most typically, the rosette comprises a raised hub which is formed integrally with the base/bottom element or tray, preferably by injection molding. The hub includes a plurality of small gripping teeth or fingers for radially engaging the central aperture in the CD. Generally, the central aperture of the CD is positioned over the rosette and a slight downward pressure is applied. Due to the relative dimensions of the central aperture and the rosette, the downward pressure causes the gripping teeth or fingers to deflect radially inwardly and to resiliently engage the central aperture of the CD. In this way the rosette engages and secures the CD in place during storage.

It has become conventional for the elements of the CD enclosures to be formed by injection molding. As a consequence the rosettes are formed of the same plastic material as the base or tray with which they are integrally molded. The base and/or tray elements and, therefore, the rosettes have typically been made from pigmented thermoplastic molding resins having sufficient impact resistance to withstand the forces attendant to mounting and unmounting CDs as well as the forces experienced during shipping and handling.

More recently there has arisen a growing demand for additional graphic display space on CD enclosures. As a consequence it has become desirable to provide a clear, see through tray or base so that a larger percentage of graphic area is visible to the consumer. In order to achieve a clear, see through tray or base, a transparent plastic material must be used. One material which has emerged as the material of choice is crystalline polystyrene. Although a functional CD tray or base can be molded with crystalline polystyrene using known injection molding techniques and existing molds without substantial change to the enclosure design, the brittleness of crystalline polystyrene has caused significant problems with the rosette. Specifically, the molded gripping teeth or fingers have evidenced a tendency to fracture and/or break away during mounting and unmounting of the CDs and during shipping and handling operations due to the brittleness of the crystalline polystyrene. This can result in a loss of engagement between the rosette and the central aperture of the CD, allowing the CD to move within the enclosure and to become damaged by impairing the recording media stored thereon. Alternatively, or in addition, the fractured teeth or fingers can become loose and move around in the enclosure, damaging the surface of the CD by scratching the surface and impairing the stored recording media thereon.

Efforts have been made to reinforce the teeth or fingers of the rosette. See, for example, U.S. Pat. No. 5,515,968 and U.S. Pat. No. 5,494,156. However, attempts to redesign the rosettes or to reinforce them suffer from one or more shortcomings which make the resulting rosette either unsatisfactory or not particularly desirable for use in a CD enclosure. Either the rosette is undesirable because it is uneconomical to manufacture or it is unsatisfactory because it remains susceptible to fracture in use and presents substantial risk of damaging the information bearing surface of the disc. Accordingly, there remains a need for a simple, inexpensive to manufacture and easy to use rosette for a CD enclosure which is configured to facilitate safe mounting and unmounting of the disc thereon and which does not present a damage risk for the disc's information bearing surface.

SUMMARY OF THE INVENTION

It is therefore a primary object of the present invention to provide a rosette for a CD enclosure which permits its manufacture by injection molding using low impact strength plastics, such as crystalline polystyrene, which is configured to facilitate safe mounting and unmounting of the disc thereon and which does not present a damage risk for the disc's information bearing surface.

It is also an object of the present invention to provide an improved rosette for a CD enclosure which is simple, inexpensive to manufacture and easy to use.

It is another object of the present invention to provide a rosette for a CD enclosure which can be formed from a typically brittle plastic material yet which includes sufficiently durable and resilient fingers for safely and effectively engaging the central aperture of a CD for retaining it in place within a CD enclosure.

The foregoing and other objects are achieved in accordance with the present invention by providing engagement means for securing at least one disc shaped element having a central aperture, the engagement means comprising: a) a raised circular hub having a substantially cylindrical side wall, the hub projecting upward from a planar base; b) at least one resilient, arcuate, circumferentially extending finger integrally formed with the hub and extending along the perimeter of the hub, each finger being formed integrally with the hub at one end and free at the other end, the free ends of the fingers being resiliently deflectable arcuately inwardly from the perimeter of the hub; c) whereby the perimetric edge of the disc central aperture engages the fingers when the disc is placed on the hub causing the fingers to move arcuately inwardly from the perimeter of the hub to allow the disc central aperture to slide downwardly over the hub, the fingers resiliently engaging the perimetric edge of the disc central aperture to hold the disc in place on the hub.

Desirably, the engagement means further includes a radially extending protrusion on the free end of each finger projecting outwardly beyond the outside diameter of the hub for engaging a bottom perimetric edge of the disc central aperture when the disc is placed on the hub for causing the fingers to move arcuately inwardly, the protrusions being adapted to resiliently engage a top perimetric edge of the disc central aperture after the disc slides downwardly over the protrusions for removably securing the disk onto the hub. In addition, the engagement means also includes at least one aperture defined in the base, the number of apertures corresponding to the number of the fingers, the fingers being arranged so that the free ends thereof overhang the apertures for permitting the free ends to substantially unobstructedly deflect when the disc is inserted on the hub. The rosette of the invention can be further strengthened by providing at least one rib molded on the underside of each finger adjacent the fixed end thereof for reinforcing the finger without inhibiting the flexibility and freedom of movement of the free end of the finger.

DESCRIPTION OF THE PREFERRED EMBODIMENT

Figure 1:
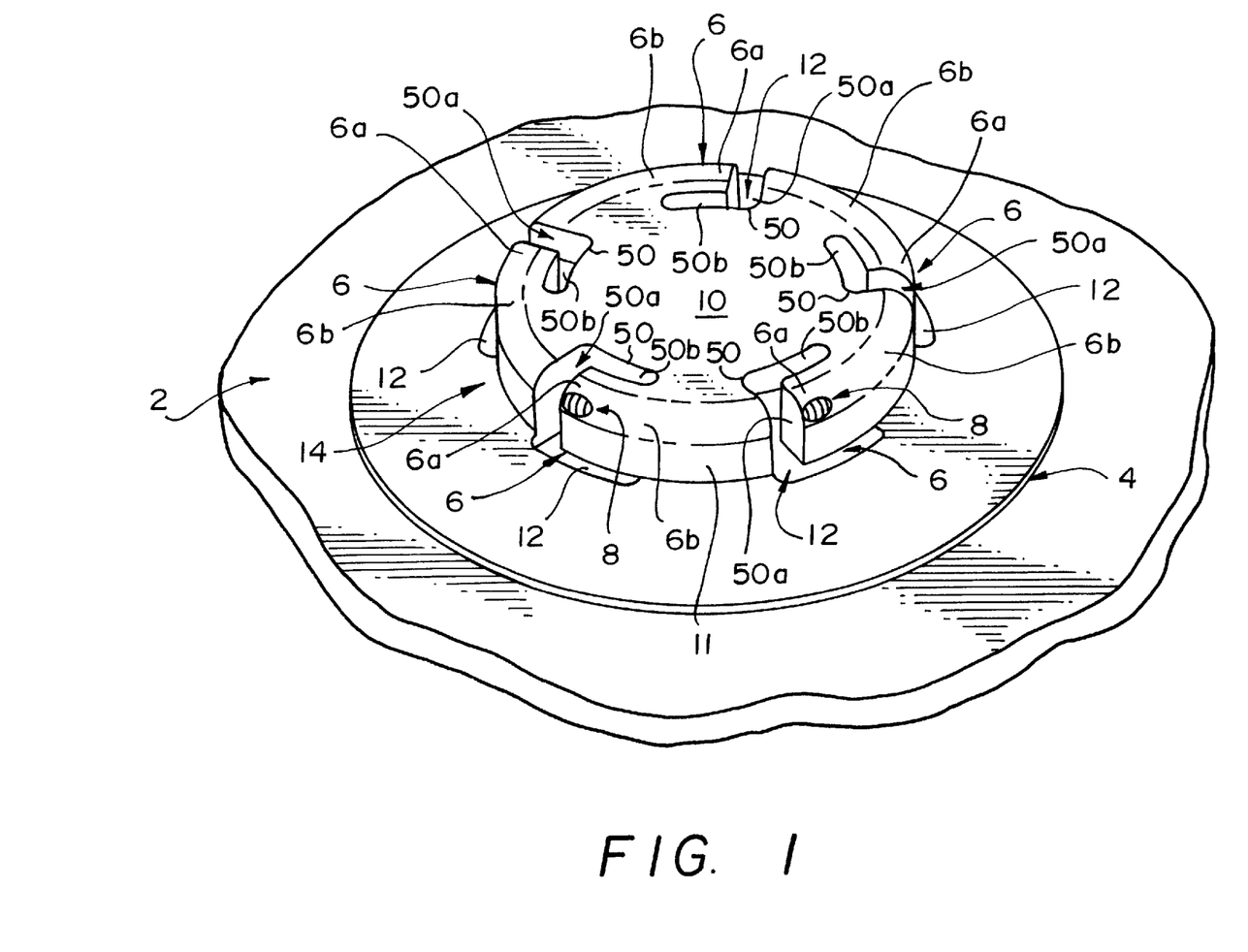
FIG. 1 is a perspective view of one embodiment of the improved rosette of the present invention.
Figure 2:
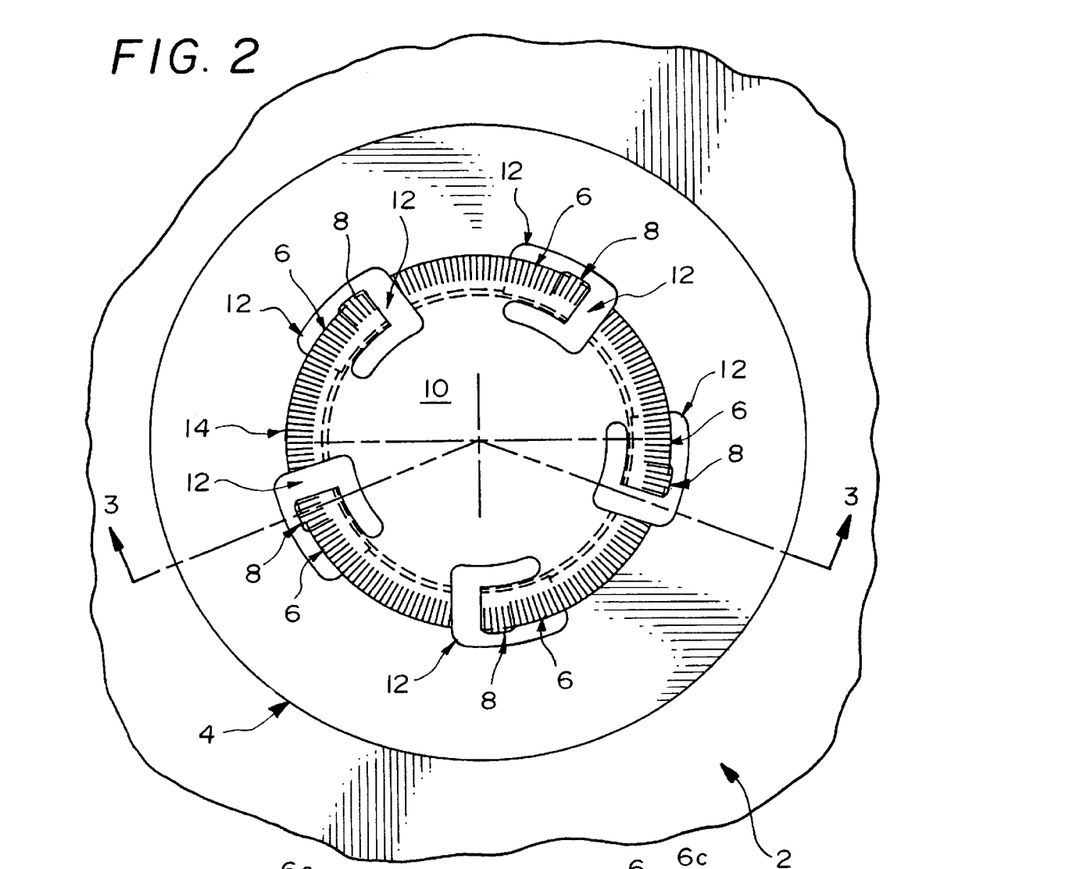
FIG. 2 is a plan view of the improved rosette of FIG. 1.
Figure 3:
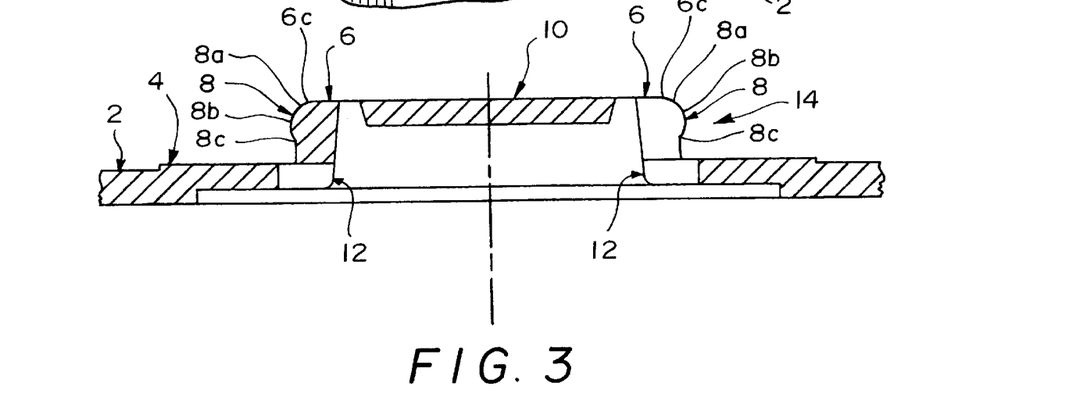
FIG. 3 is a sectional view taken along line 3—3 of FIG. 2.

A preferred embodiment of the present invention is illustrated in FIGS. 1, 2 and 3 in which there is illustrated an improved rosette or mounting hub 14 for a CD enclosure. Rosette 14 is generally positioned in the same location within CD enclosures as prior art rosettes, i.e., generally centrally located on the insert or tray of three piece enclosures or on the base of two piece enclosures. Desirably, rosette 14 is molded integrally with the base or tray of the enclosure. In the embodiment of FIGS. 1–3, rosette 14 is molded on raised CD seat 4 which, itself, is molded on tray or base 2. Raised seat 4 provides a circular surface on which the annular area of the CD which is immediately adjacent the central disc aperture can be supported above the base 2. This area of the CD typically contains no recorded information and, therefore, contact between the CD in this area and the raised seat will not damage the CD. The CD may optionally be peripherally supported at its outer edges which also, typically, contains no recorded information in order to provide further assurance that contact of the recorded areas of the CD with either the base or tray or the cover of the CD enclosure will be avoided. Extending upward from disc seat 4 is rosette 14 which is essentially a vertical cylindrical section divided by generally L-shaped slits 50 into a plurality of arcuate, circumferentially extending fingers 6. Each L-shaped slit in rosette 14 has a first leg slit 50a extending generally radially through circumferential side wall 11 of rosette 14 and a short distance across top wall 10 and a second leg slit 50b in the top wall 10 extending, from the end of the first leg slit, generally parallel to the circumferential side wall 11 of the rosette 14. In this way each L-shaped slit defines a circumferentially extending finger 6 having a radial thickness defined by the radial distance between side wall 11 and second leg slit 50b and a circumferential length defined by the length of second leg slit 50b. Each finger 6 is formed integrally with the rosette 14 at one end 6b and is free at the other end 6a. The free end 6a of each finger 6 overlies an opening 12 defined in raised seat 4 on which rosette 14 is positioned to allow free movement of the free end in an arcuate direction, i.e., generally toward the geometric center of rosette 14. Each of the fingers 6 is associated with each of the openings 12. Although five fingers and five openings are illustrated, it will be appreciated that any number of fingers and corresponding openings may be located at more or less regularly spaced intervals along the circumference of rosette 14. Preferably, rosette 14 comprises at least two fingers 6 and corresponding openings 12. Most desirably, rosette 14 comprises at least four fingers 6 and corresponding openings 12. The openings 12 may of any desirable or convenient shape consistent with their function which is to allow the free ends 6a of fingers 6 to deflect unobstructedly in response to a deforming force. Inasmuch as ends 6b of fingers 6 are integrally formed with the rosette, ends 6b are secured 5 while ends 6a are free to pivot or otherwise deflect in a plane parallel to base 2 in response to the force applied during mounting of a CD.

At the free end 6a of each finger 6 a protrusion 8 is formed which extends radially outwardly beyond the outer diameter of the rosette 14 with fingers 6 in their rest position and extends circumferentially along side wall 11 from the free end 6a toward fixed end 6b. As can be seen in FIG. 2, protrusion 8 desirably extends circumferentially only a short distance along side wall 11 although it may extend a greater distance, up to the entire circumferential length of finger 6, if desired. With reference to FIG. 3, it will be seen that in a vertical plane, such as A—A', protrusion 8 is formed as a complex curve gently extending from the outward and downward curvature of the radially outer edges 6c of the axial top surface of finger 6. Protrusion 8 extends outwardly and downwardly from merge point 8a with finger top surface outer edges 6c, along side wall 11 to curve apex 8b and then inwardly and downwardly to the point 8c where protrusion 8 merges with side wall 11. A protrusion configured generally in this manner provides a guide curvature which allows the CD to slip easily over rosette 14.

The outer diameter of rosette 14 measured to the radial edges of fingers 6 is slightly larger than the diameter of the disc central aperture. Protrusions 8 extend radially outwardly from the radial edges of the fingers which makes the outer diameter at the protrusions even larger than the outer diameter of the rosette 14. In use, the free ends 6a of fingers 6 deflect slightly inwardly from their rest position toward the center of rosette 14 under pressure from the perimetric edge of the central disc aperture in contact with protrusions 8 as the CD is fitted over the fingers onto the rosette. Pressure exerted as the CD is pressed vertically over the fingers 6 into contact with radial outer edge of the finger top surface 6c and the protrusions 8 between upper merge point 8a and apex 8c causes displacement of the free ends 6a of the fingers 6 radially inwardly along an inwardly directed arc. Thus, the effective diameter of the rosette temporarily decreases to accommodate the somewhat smaller diameter of the disc central aperture. After the disc has passed apex 8b of protrusions 8, fingers 6 begin to resiliently return toward their rest position. When the disc has passed merge point 8c, the side wall 11 of rosette 14 engages the perimetric edge of the disc central aperture to securely hold the disc in position. At this point, because rosette outer diameter is slightly larger than the diameter of the disc central aperture, the fingers 6 have not completely returned to their rest position and are, therefore, resiliently biased against and applying a light, secure, outward directed pressure to the perimetric edge of the disc central aperture. When the disc is fully seated on raised seat 4, it is securely held in place on rosette 14 by the radially outward directed pressure of the resilient fingers 6 and by the pressure of protrusions 8 along the upper surface of the perimetric edge of the disc central aperture. Removal of the disc from rosette 14 is accomplished simply by exerting a light upward pressure to the edge of the disc. The pressure of the disc against the protrusions between merge point 8c and apex 8b again causes displacement of the free ends 6a of the fingers 6 radially inwardly along an inwardly directed arc. Thus, the effective diameter of the rosette again temporarily decreases to accommodate the somewhat smaller diameter of the disc central aperture. After the disc has passed apex 8b of protrusions 8, a light continued upward pressure causes it to break free of rosette 14. The rosette of the present invention may, if desired, be of such a height that two or more CD's can be securely supported thereon, for example, one above the other.

Figure 4:
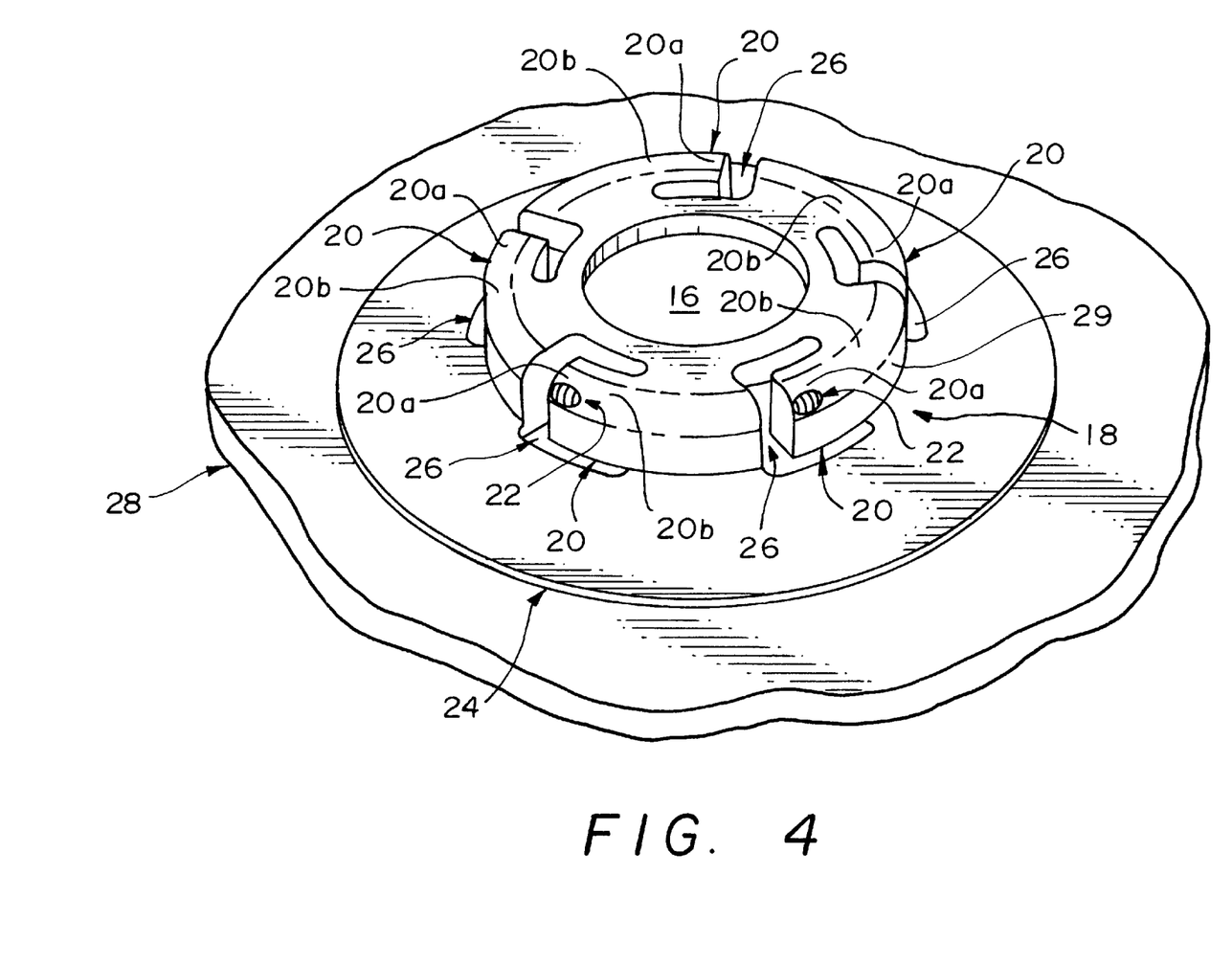
FIG. 4 is a perspective view of another embodiment of the improved rosette of the present invention.

A second embodiment of the rosette of the present invention is illustrated in FIG. 4 which is identical to the rosette 14 of FIGS. 1–3 except that in FIG. 4 rosette 18 is essentially a vertical cylindrical section having a central opening 16 in the center thereof. More specifically, rosette 18 extends upward from disc seat 24 which, in turn, is raised from base or tray 28. Rosette 18 comprises a plurality of arcuate, circumferentially extending fingers 20, the free end 20a of each of which overlies a corresponding opening 26 in raised seat 24. At the free end 20a of each finger 20 a protrusion 22 is formed which extends radially outwardly beyond the outer diameter of the fingers 20 in their rest position and extends circumferentially along side wall 29 of rosette 18 from the free end 20a toward fixed end 20b of fingers 20. In use, as with rosette 14, the free ends 20a of fingers 20 deflect slightly inwardly from their rest position toward the center of rosette 18 under pressure from the perimetric edge of the central disc aperture in contact with protrusions 22 as the CD is fitted over the fingers onto the rosette. Pressure exerted as the CD is pressed vertically over the fingers 20 causes displacement of the free ends 20a of the fingers 20 radially inwardly along an inwardly directed arc to temporarily decrease the effective diameter of the rosette to accommodate the somewhat smaller diameter of the disc central aperture. After the disc has passed the apex of protrusions 22, fingers 20 begin to resiliently return toward their rest position until the side wall 29 of rosette 18 engages the perimetric edge of the disc central aperture to securely hold the disc in position.

Figure 5:
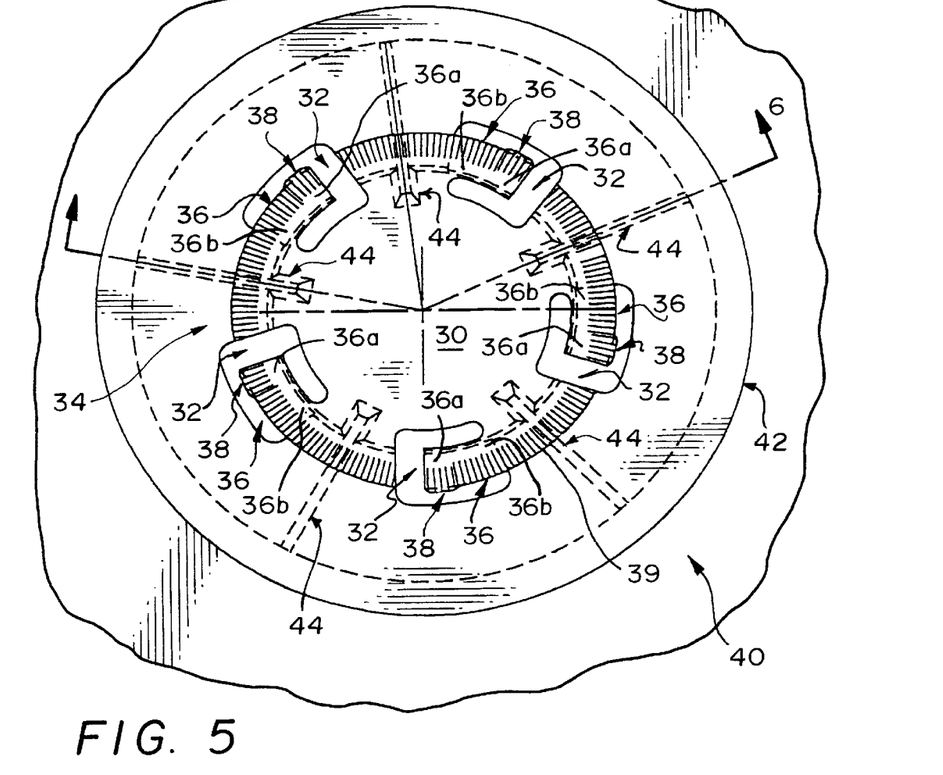
FIG. 5 is a plan view of still another embodiment of the improved rosette of the present invention.
Figure 6:
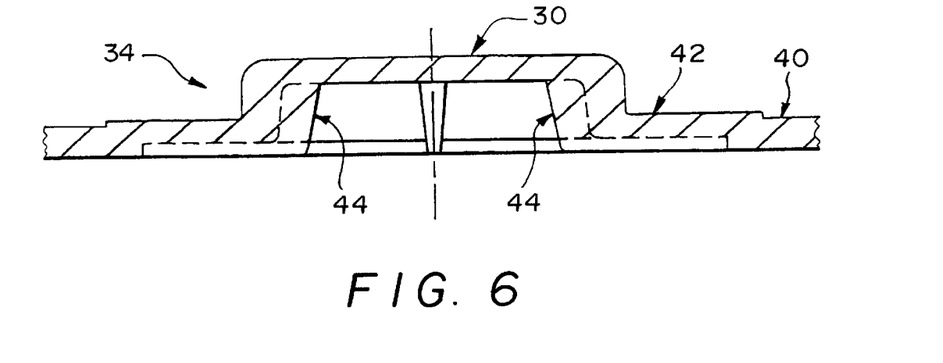
FIG. 6 is a sectional view taken along line 6—6 of FIG. 5.
Figure 7:
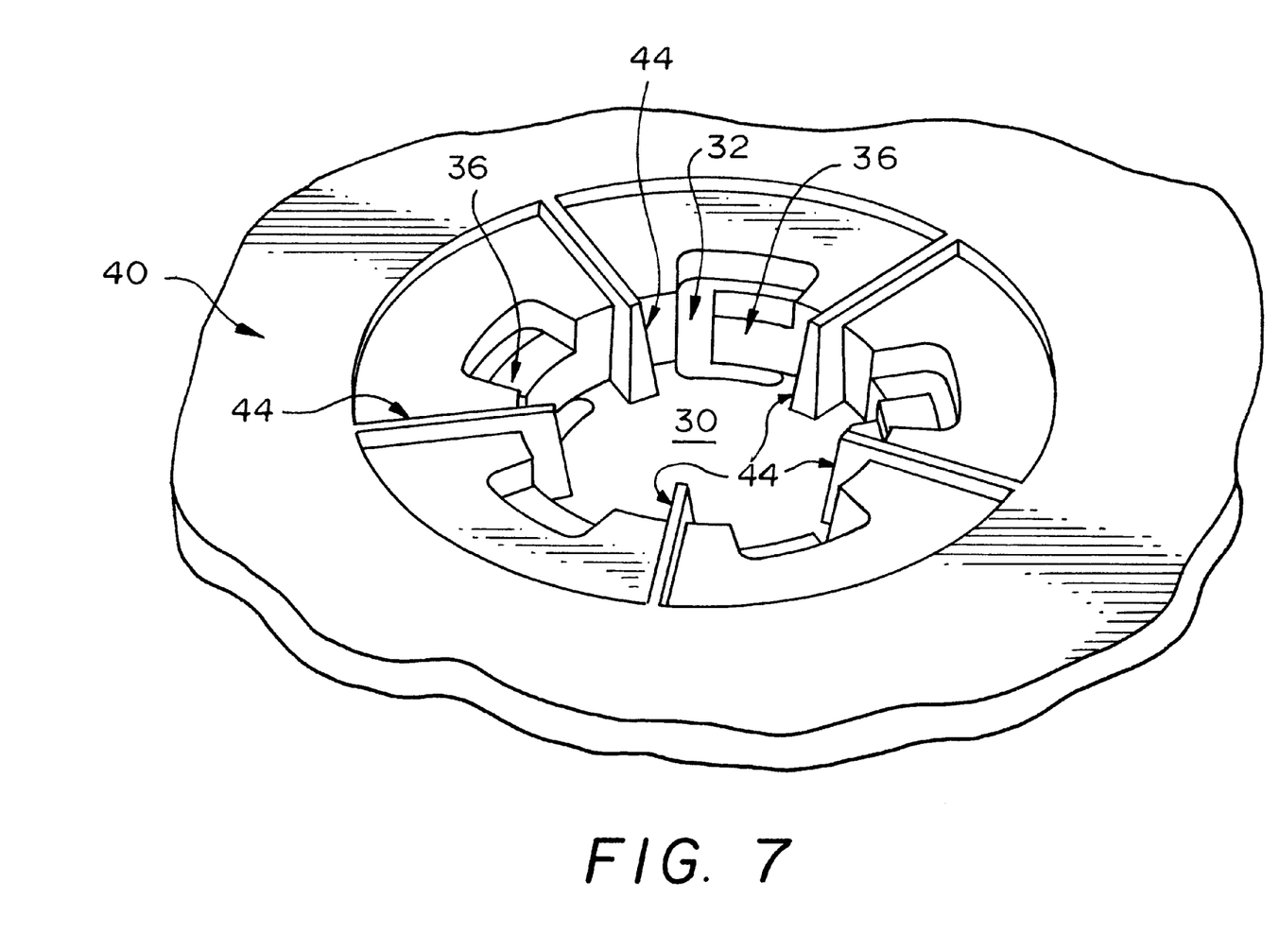
FIG. 7 is a perspective view of the underside of the improved rosette of FIG. 5.

A third embodiment of the rosette of the present invention is illustrated in FIGS. 5–6 which is identical to the rosette 14 of FIGS. 1–3 except that in FIGS. 5–7 rosette 34 includes a plurality of ribs 44 integrally molded on the underside of each finger 36. More specifically, rosette 34 extends upward from disc seat 42 which, in turn, is raised from base or tray 40. Rosette 34 has a closed top wall 30 and comprises a plurality of arcuate, circumferentially extending fingers 36, the free end 36a of each of which overlies a corresponding opening 32 in raised seat 42. At the free end 36a of each finger 36 a protrusion 38 is formed which extends radially outwardly beyond the outer diameter of the fingers 36 in their rest position and extends circumferentially along side wall 39 of rosette 34 from the free end 36a toward fixed end 36b of fingers 36. A molded rib 44 on the underside of each finger 36 is positioned to extend radially through the fixed end 36b thereof from a point radially inward of the inner diameter of fingers 36 to a point radially outward of the outer diameter of fingers 36 in order that it may reinforce each finger without inhibiting the flexibility and freedom of movement of the free end 36a of finger 36. In use, as with rosette 14, the free ends 36a of fingers 36 deflect slightly inwardly from their rest position toward the center of rosette 34 under pressure from the perimetric edge of the central disc aperture in contact with protrusions 38 as the CD is fitted over the fingers onto the rosette. Pressure exerted as the CD is pressed vertically over the fingers 36 causes displacement of the free ends 36a of the fingers 36 radially inwardly along an inwardly directed arc to temporarily decrease the effective diameter of the rosette to accommodate the somewhat smaller diameter of the disc central aperture. After the disc has passed the apex of protrusions 38, fingers 36 begin to resiliently return toward their rest position until the side wall 39 of rosette 34 engages the perimetric edge of the disc central aperture to securely hold the disc in position.

Figure 8:
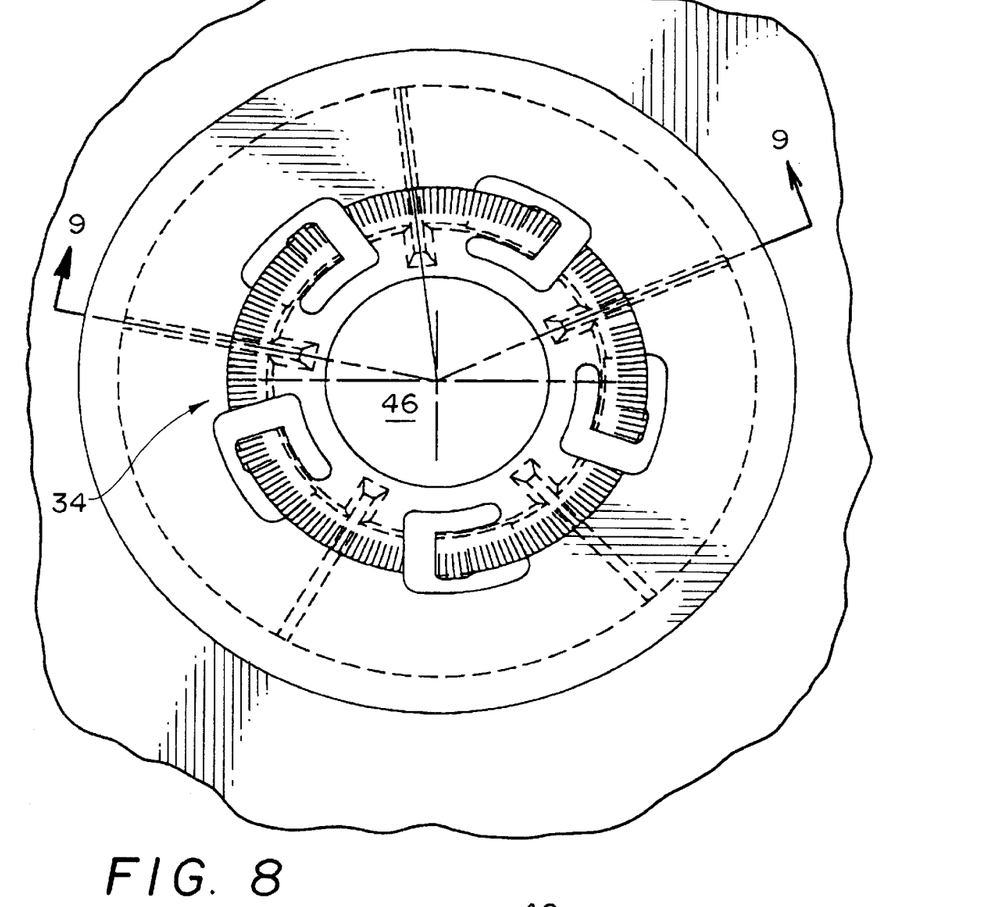
FIG. 8 is a plan view of yet another embodiment of the improved rosette of the present invention.
Figure 9:
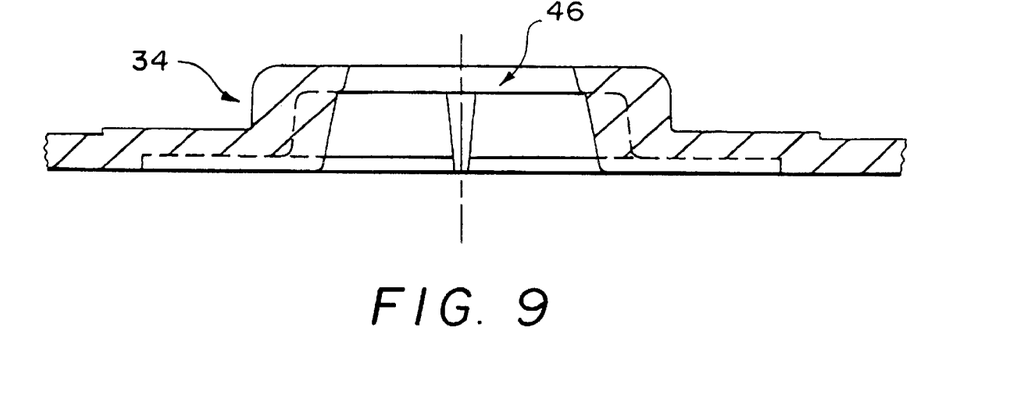
FIG. 9 is a sectional view taken along line 9—9 of FIG. 8.

A fourth embodiment of the rosette of the present invention is illustrated in FIGS. 8–9 which is identical to the rosette 34 of FIGS. 5–7 except that in FIGS. 8–9 rosette 34 is essentially a vertical cylindrical section having a central opening 46 in the center thereof.

The present invention is directed not only to the improved rosette described herein but also to an improved insert or tray for securing and storing one or more CDs, which insert or tray is particularly useful as an element of three piece CD enclosures. Typically, such an insert or tray comprises a substantially planar surface from which the improved rosette of the present invention projects upwardly. Desirably, the insert or tray includes a raised circular seat from which the rosette projects and on which the annular area of the CD which is immediately adjacent the central disc aperture can be supported. This area of the CD typically contains no recorded information and, therefore, contact between the CD in this area and the raised seat will not damage the CD. The insert or tray may also include a supporting raised surface for peripherally supporting the CD along its outer edges which also, typically, contain no recorded information and which will not be damaged by contact with the tray. Typically, the rosette of the present invention is positioned in the center of the insert or tray. However, if the insert or tray is substantially larger than the CD, is shaped to store other CDs or items other than CDs, or for other reasons, the rosette need not be positioned in the center of the insert or tray. CD three piece enclosures generally also include a base or bottom element in which the insert or tray may be removably secured and a lid or cover element which is hinged to the base or bottom element and is closed thereon after the disc is mounted therein on the rosette. Where the CD enclosure is of the two piece variety, the tray or insert generally comprises the base or bottom element of the enclosure to which the lid or cover is hinged.

The present invention is desirably employed for molding brittle or low impact resistant clear thermoplastic resins. However, it is equally applicable when any moldable thermoplastic resin, whether clear, translucent, opaque, pigmented, tinted or otherwise, low or high impact resistance, is utilized. The invention is particularly advantageous for the injection molding of crystalline polystyrene and other styrenic polymers, such as copolymers and terepolymers containing styrene copolymerized with other monomers or other brittle polymers.

While the present invention has been described in terms of specific embodiments thereof, it will be understood that no limitations are intended to the details of construction or design other than as defined in the appended claims.

We claim:

1. A disc retaining member for securing at least one disc shaped element having a central aperture, said member comprising:
   a) a raised circular hub having a substantially cylindrical side wall, said hub projecting upward from a planar base;
   b) at least one resilient, arcuate, circumferentially extending finger integrally formed with said hub and extending along the perimeter of said hub, each finger having a first end formed integrally with said hub and a free end which is separated from said hub and base to allow radial deflection thereof, the free end of said at least one finger being resiliently deflectable radially inwardly from the perimeter of the hub in a plane parallel to said base;
   c) wherein the perimetric edge of the disc central aperture engages said at least one finger when the disc is placed on said hub causing said at least one finger to move radially inwardly from the perimeter of the hub to allow the disc central aperture to slide downwardly over said hub, said at least one finger resiliently engaging the perimetric edge of the disc central aperture to hold the disc in place on the hub.

2. A disc retaining member, as claimed in claim 1, wherein each said finger includes a radially extending protrusion on the free end thereof projecting outwardly beyond the outside diameter of said hub for engaging a bottom perimetric edge of the disc central aperture when the disc is placed on the hub for causing said at least one finger to move radially inwardly, said protrusion adapted to resiliently engage a top perimetric edge of the disc central aperture after said disc slides downwardly over said protrusions for removably securing said disk onto said hub.

3. A disc retaining member according to claim 1, wherein said at least one finger comprises a plurality of fingers, and further including a plurality of apertures defined in said base, and each finger being arranged so that the free end thereof overhangs a corresponding one of said apertures for permitting said free end to substantially unobstructedly deflect when said disc is inserted on said hub.

4. A disc retaining member, as claimed in claim 3, wherein said apertures are located at less regularly spaced apart intervals along the circumference of said hub.

5. A disc retaining member, as claimed in claim 2, wherein the diameter of said raised circular hub is slightly larger than the diameter of said disc central aperture.

6. A disc retaining member, as claimed in claim 5, wherein the top surface of the free end of each finger adjacent the side wall of the hub is curved outwardly and downwardly.

7. A disc retaining member, as claimed in claim 2, wherein the cross sectional shape of said protrusion in a radially extending vertical plane perpendicular to said base is a complex curve extending radially outwardly from the top surface of the free end of each finger and downwardly along said side wall to the apex of the curve and radially inwardly from the apex and downwardly along said side wall until said curve merges with said side wall.

8. A disc retaining member, as claimed in claim 5, wherein the cross sectional shape of said protrusion in a radially extending vertical plane perpendicular to said base is a complex curve extending radially outwardly from the top surface of the free end of each finger and downwardly along said side wall to the apex of the curve and radially inwardly from the apex and downwardly along said side wall until said curve merges with said side wall.

9. A disc retaining member, as claimed in claim 1, including at least one generally L-shaped slit in said raised circular hub for defining said at least one circumferentially extending finger, the number of L-shaped slits corresponding to the number of said fingers, each said L-shaped slit comprising a first leg slit extending generally radially through said side wall and a second leg slit extending, from the end of said first leg slit, generally parallel to said side wall, whereby said circumferentially extending finger is defined between said side wall and said second leg slit with said free end adjacent said first leg slit.

10. A disc retaining member, as claimed in claim 1, further including an integrally formed rib on the underside of each finger.

11. A disc retaining member, as claimed in claim 10, wherein said rib extends radially through the fixed end of said finger.

12. A disc retaining member, as claimed in claim 1, further including at least one aperture defined in said base, the number of apertures corresponding to the number of said fingers, said fingers being arranged so that the free ends thereof overhang said apertures for permitting said free ends to substantially unobstructedly deflect when said disc is inserted on said hub and wherein each said finger includes a radially extending protrusion on the free end thereof projecting outwardly beyond the outside diameter of said hub for engaging a bottom perimetric edge of the disc central aperture when the disc is placed on the hub for causing said fingers to move arcuately inwardly, said protrusions being adapted to resiliently engage a top perimetric edge of the disc central aperture after said disc slides downwardly over said protrusions for removably securing said disk onto said hub.

13. A disc retaining member, as claimed in claim 12, wherein the diameter of said raised circular hub is slightly larger than the diameter of said disc central aperture, wherein the top surface of the free end of each finger adjacent the side wall of the hub is curved outwardly and downwardly and wherein the cross sectional shape of said protrusion in a radially extending vertical plane perpendicular to said base is a complex curve extending radially outwardly from the top surface of the free end of each finger and downwardly along said side wall to the apex of the curve and radially inwardly from the apex and downwardly along said side wall until said curve merges with said side wall.

14. A disc retaining member, as claimed in claim 1, including at least four resilient, arcuate, circumferentially extending fingers integral with said hub.

15. A disc retaining member, as claimed in claim 3, wherein each said finger includes a radially extending protrusion on the free end thereof projecting outwardly beyond the outside diameter of said hub and the cross sectional shape of said protrusion in a radially extending vertical plane perpendicular to said base is a complex curve extending radially outwardly from the top surface of the free end of each finger and downwardly along said side wall to the apex of the curve and radially inwardly from the apex and downwardly along said side wall until said curve merges with said side wall.

16. A storage tray for storing and securing at least one disc shaped element having a central aperture, said tray comprising a substantially planar base having a disc retaining member integral therewith, said member comprising:
   a) a raised circular hub having a substantially cylindrical side wall, said hub projecting upward from said planar base;
   b) at least one resilient, arcuate, circumferentially extending finger integrally formed with said hub and extending along the perimeter of said hub, each finger having a first end formed integrally with said hub and a free end which is separated from said hub and base to allow radial deflection thereof, the free end of said at least one finger being resiliently deflectable radially inwardly from the perimeter of the hub in a plane parallel to said base;
   c) wherein the perimetric edge of the disc central aperture engages said at least one finger when the disc is placed on said hub causing said at least one finger to move radially inwardly from the perimeter of the hub to allow the disc central aperture to slide downwardly over said hub, said at least one finger resiliently engaging the perimetric edge of the disc central aperture to hold the disc in place on the hub.

17. A storage tray, as claimed in claim 16, wherein said at least one finger includes a radially extending protrusion on the free end thereof projecting outwardly beyond the outside diameter of said hub for engaging a bottom perimetric edge of the disc central aperture when the disc is placed on the hub for causing said at least one finger to move radially inwardly, said protrusion being adapted to resiliently engage a top perimetric edge of the disc central aperture after said disc slides downwardly over said protrusion for removably securing said disk onto said hub.

18. A storage tray, as claimed in claim 16, wherein said at least one finger comprises a plurality of fingers, and further including a plurality of apertures defined in said base, and each finger being arranged so that the free end thereof overhangs a corresponding one of said apertures for permitting said free end to substantially unobstructedly deflect when said disc is inserted on said hub.

19. A storage tray, as claimed in claim 18, wherein said apertures are located at regularly spaced apart intervals along the circumference of said hub.

20. A storage tray, as claimed in claim 17, wherein the diameter of said raised circular hub is slightly larger than the diameter of said disc central aperture.

21. A storage tray, as claimed in claim 20, wherein the top surface of the free end of each finger adjacent the side wall of the hub is curved outwardly and downwardly.

22. A storage tray, as claimed in claim 17, wherein the cross sectional shape of said protrusion in a radially extending vertical plane perpendicular to said base is a complex curve extending radially outwardly from the top surface of the free end of each finger and downwardly along said side wall to the apex of the curve and radially inwardly from the apex and downwardly along said side wall until said curve merges with said side wall.

23. A storage tray, as claimed in claim 20, wherein the cross sectional shape of said protrusion in a radially extending vertical plane perpendicular to said base is a complex curve extending radially outwardly from the top surface of the free end of each finger and downwardly along said side wall to the apex of the curve and radially inwardly from the apex and downwardly along said side wall until said curve merges with said side wall.

24. A storage tray, as claimed in claim 16, including at least one generally L-shaped slit in said raised circular hub for defining said at least one circumferentially extending finger, the number of L-shaped slits corresponding to the number of said fingers, each said L-shaped slit comprising a first leg slit extending generally radially through said side wall and a second leg slit extending, from the end of said first leg slit, generally parallel to said side wall, whereby said circumferentially extending finger is defined between said side wall and said second leg slit with said free end adjacent said first leg slit.

25. A storage tray, as claimed in claim 16, further including an integrally formed rib on the underside of each finger.

26. A storage tray, as claimed in claim 25, wherein said rib extends radially through the fixed end of said finger.

27. A storage tray, as claimed in claim 16, wherein said at least one finger comprises a plurality of fingers, and further including a plurality of apertures defined in said base, and each finger being arranged so that the free end thereof overhangs a corresponding one of said apertures for permitting said free end to substantially unobstructedly deflect when said disc is inserted in said hub.

28. A storage tray, as claimed in claim 27, wherein the diameter of said raised circular hub is slightly larger than the diameter of said disc central aperture, wherein the top surface of the free end of each finger adjacent the side wall of the hub is curved outwardly and downwardly and wherein the cross sectional shape of said protrusion in a radially extending vertical plane perpendicular to said base is a complex curve extending radially outwardly from the top surface of the free end of each finger and downwardly along said side wall to the apex of the curve and radially inwardly from the apex and downwardly along said side wall until said curve merges with said side wall.

29. A storage tray, as claimed in claim 16, including at least four resilient, arcuate, circumferentially extending fingers integral with said hub.

30. A storage tray, as claimed in claim 17, wherein said at least one finger includes a radially extending protrusion on the free end thereof projecting outwardly beyond the outside diameter of said hub for engaging a bottom perimetric edge of the disc central aperture when the disc is placed on the hub for causing said at least one finger to move radially inwardly, said protrusion being adapted to resiliently engage a top perimetric edge of the disc central aperture after said disc slides downwardly over said protrusion for removably securing said disk onto said hub.

* * * * *